A. S. BARNWELL.
Cultivator.

No. 62,808.  Patented Mar 12, 1867.

United States Patent Office.

A. S. BARNWELL, OF SAVANNAH, GEORGIA.

Letters Patent No. 62,808, dated March 12, 1867.

---

IMPROVEMENT IN CULTIVATORS.

---

The Schedule referred to in these Letters Patent and making part of the same.

---

TO ALL WHOM IT MAY CONCERN:

Be it known that I, A. S. BARNWELL, of Savannah, in the county of Chatham, and State of Georgia, have invented a new and improved Cultivator Plough; and I do hereby declare that the following is a full, clear, and exact description thereof, which will enable others skilled in the art to make and use the same, reference being had to the accompanying drawings, forming part of this specification, in which—

Figure 1:
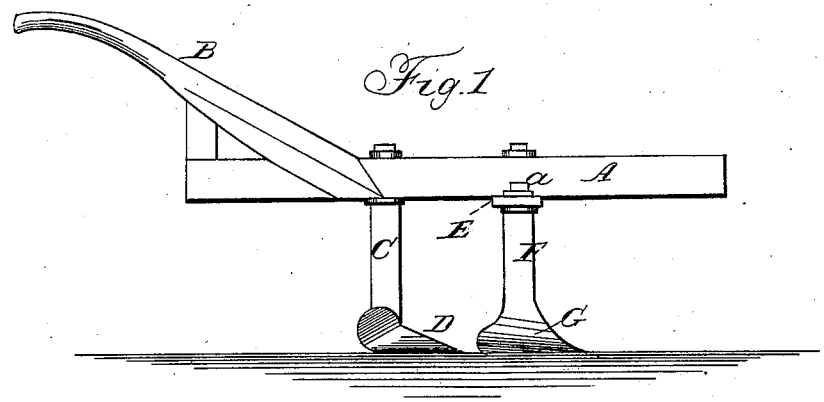

Figure 1 is a side view of my invention.

Figure 2:
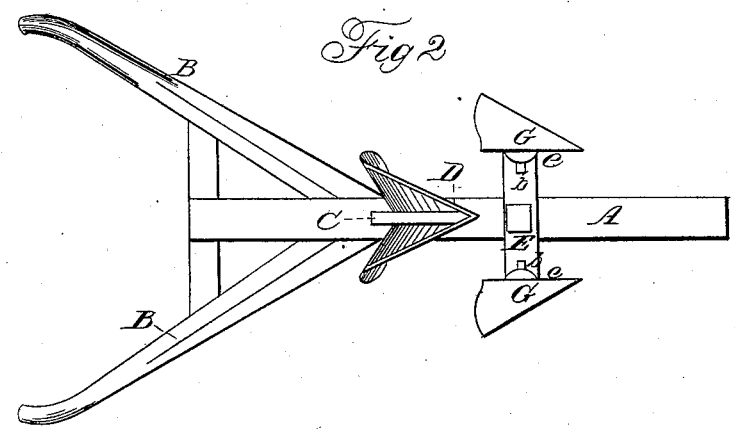

Figure 2, an inverted plan of the same.

Similar letters of reference indicate like parts.

This invention consists in constructing and arranging the shares of the implement in such a manner that weeds will be effectually cut from the sides of the rows of plants, and the whole width of the spaces between the rows turned or worked over, and the soil rendered light and friable.

A represents the beam of the implement, and B B handles attached thereto in the usual or any proper manner. C is a standard, attached to the beam and having a double or V-shaped share, D, at its lower end, said share being directly underneath or in line with the beam A. E is a bar, which may be of metal, and is attached transversely to the under side of the beam A, in front of the standard C, said bar E projecting at equal distances from the sides of the beam, and having a standard, F, attached to each end of it by means of bolts, $a$, which pass through oblong slots, $b$, in the bar E, and admit of the standards C being adjusted nearer together or further apart, as may be desired. To the lower end of each standard, C, there is attached a share, G, the inner edges $c$ of which are parallel with each other and the beam A, as shown clearly in fig. 2. These shares G are so constructed as to throw the earth from the rows of plants, and they cut out the weeds and cast the same with the loose earth directly in front of the double share D, which penetrates the earth below the loose earth thrown in front of it by the shares G G, and casts the earth ploughed up by it, as well as that thrown in front of it by G G, to the sides of the rows.

By this arrangement it will be seen that the earth between the rows of plants will be thoroughly worked over, and rendered light and friable, and all weeds eradicated. The shares G G, by means of the adjustable standards F, may be adapted to the width of the spaces between the rows of plants.

Having thus described my invention, I claim as new, and desire to secure by Letters Patent—

The two adjustable shares G G, in combination with the fixed double share D, applied to the beam A, and arranged to operate in the manner substantially as and for the purpose set forth.

The above specification of my invention signed by me this 10th day of November, 1866.

A. S. BARNWELL.

Witnesses:
WM. F. MCNAMARA,
ALEX. F. ROBERTS.